United States Patent
Smith et al.

(10) Patent No.: US 9,245,181 B2
(45) Date of Patent: *Jan. 26, 2016

(54) METHOD AND SYSTEM FOR RESOLUTION CONVERSION OF TEXTUAL CONTENT OR MAGNETIC INK CHARACTER RECOGNITION (MICR) CONTENT

(71) Applicant: XEROX CORPORATION, Norwalk, CT (US)

(72) Inventors: Mark Andrew Smith, Rochester, NY (US); Gregory Scott Widener, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/947,658

(22) Filed: Jul. 22, 2013

(65) Prior Publication Data

US 2015/0023582 A1    Jan. 22, 2015

(51) Int. Cl.
  *G06K 9/00* (2006.01)
  *H04N 1/40* (2006.01)
  *H04N 1/00* (2006.01)

(52) U.S. Cl.
  CPC .............. *G06K 9/00442* (2013.01); *H04N 1/00* (2013.01); *H04N 1/40068* (2013.01)

(58) Field of Classification Search
  None
  See application file for complete search history.

(56) References Cited

U.S. PATENT DOCUMENTS

| | | | |
|---|---|---|---|
| 4,034,343 A | 7/1977 | Wilmer | |
| 5,524,066 A | 6/1996 | Kaplan et al. | |
| 5,668,891 A | 9/1997 | Fan et al. | |
| 2004/0190027 A1* | 9/2004 | Foster et al. | 358/1.9 |
| 2014/0111818 A1* | 4/2014 | Rosello et al. | 358/1.9 |
| 2014/0233837 A1* | 8/2014 | Sandoz et al. | 382/138 |

* cited by examiner

*Primary Examiner* — Vikkram Bali
*Assistant Examiner* — Tracy Mangialaschi
(74) *Attorney, Agent, or Firm* — Pillsbury Winthrop Shaw Pittman, LLP

(57) ABSTRACT

A method and a system for resolution conversion of textual content or Magnetic Ink Character Recognition (MICR) content in an image are provided. The method includes receiving image data of the image, the image data having a plurality of image planes having essentially the same resolution, wherein at least one of the plurality of image planes includes textual image data configured to be rendered by a print engine with an output resolution different from the remaining image planes; processing the at least one of the plurality of image planes to identify one or more characters contained therein and to obtain character encoding data and positional information for the one or more identified characters; and processing the obtained character encoding data and the obtained positional information to generate an output data at the output resolution for the at least one of the plurality of image planes.

20 Claims, 5 Drawing Sheets

METHOD AND SYSTEM FOR RESOLUTION CONVERSION OF TEXTUAL CONTENT OR MAGNETIC INK CHARACTER RECOGNITION (MICR) CONTENT

BACKGROUND

1. Field

The present disclosure relates to a system and a method for resolution conversion of textual content or Magnetic Ink Character Recognition (MICR) content in an image.

2. Description of Related Art

In image printing systems (e.g., inkjet image printing systems), there is a need to have different resolutions for different primary ink colors. This is a problem for most Page Description Language (PDL) imaging technologies because they render each primary ink color at the same resolution. Common interpolation methods from one resolution to another resolution do not produce optimal output at the new resolution.

One example where this is a problem is high resolution text printing in which a higher resolution is used for printing text so as to improve rendering of small text. As text is most often rendered using black color ink, black color image plane can be imaged at a higher resolution than the image planes of the other primary ink colors.

Another example where this is a problem is MICR printing using different heads or different print stations at different resolutions for printing the MICR ink.

MICR technology is generally well-known. MICR inks contain a magnetic pigment or a magnetic component in an amount sufficient to generate a magnetic signal strong enough to be readable via a MICR reader device. Generally, the ink is used to print all or a portion of a document, such as checks, bonds, security cards, etc. For example, most checks exhibit an identification code area, usually at the bottom of the check. The characters of this identification code are usually MICR encoded. The document may be printed with a combination of MICR-readable ink and non-MICR-readable ink, or with just MICR-readable ink. The document thus printed is then exposed to an appropriate source or field of magnetization, at which time the magnetic particles become aligned as they accept and retain a magnetic signal. The document can then be read by passing it through a reader device, which detects or "reads" the magnetic signal of the MICR imprinted characters. MICR readers have strict tolerances on character shape and the resulting signal strength.

The architecture of continuous feed (CF) direct marking (DM) printing systems includes the use of multiple print heads (or marking stations) distributed into several color print head modules along the printing path. These multiple print heads are distributed over a long print zone to print the desired image. An exemplary continuous feed printing system may have as many as six color modules with four print units per color module incorporating fourteen print heads. Also, the continuous feed printing system prints on a band, a web or a roll of paper/media as compared to a sheet printing system which prints on discrete sheets of media.

In one MICR implementation for the continuous feed printing system, a set of aqueous ink print heads are added to an otherwise solid inkjet printing engine having solid inkjet print heads. The aqueous ink print head technology can be different from the solid inkjet print head technology. For example, the solid inkjet print heads may be clocked at a fixed frequency no matter how fast the web moves while the MICR print heads are clocked at a rate proportional to the web speed. In another example, the solid inkjet print heads may be manufactured with a different number of nozzles per inch than the MICR print heads. Due to these differences in the print head technologies involved, the aqueous ink print heads operate at a different resolution than that of the solid inkjet print heads. Additionally, for each unique web speed, images printed with the solid inkjet print heads change resolution but those printed with the aqueous ink print heads do not. The web speed, as used herein, refers to the speed at which a roll (or a web) of media (or paper) is being fed into a continuous feed printing system.

SUMMARY

In one embodiment, a method for resolution conversion of textual content or Magnetic Ink Character Recognition (MICR) content in an image is provided. The method is implemented in a computer system comprising one or more processors configured to execute one or more computer program modules. The method includes receiving image data of the image, the image data having a plurality of image planes having essentially the same resolution, wherein at least one of the plurality of image planes includes textual image data configured to be rendered by a print engine with an output resolution different from the remaining image planes and wherein the textural image data includes high resolution text characters, MICR characters, or both; processing the at least one of the plurality of image planes to identify one or more characters contained therein and to obtain character encoding data and positional information for the one or more identified characters; and processing the obtained character encoding data and the obtained positional information to generate an output data at the output resolution for the at least one of the plurality of image planes.

In another embodiment, a system for resolution conversion of textual content or Magnetic Ink Character Recognition (MICR) content in an image is provided. The system includes at least one processor configured to: receive image data of the image, the image data having a plurality of image planes having essentially the same resolution, wherein at least one of the plurality of image planes includes textual image data configured to be rendered by a print engine with an output resolution different from the remaining image planes and wherein the textural image data includes high resolution text characters, MICR characters, or both; process the at least one of the plurality of image planes to identify one or more characters contained therein and to obtain character encoding data and positional information for the one or more identified characters; and process the obtained character encoding data and the obtained positional information to generate an output data at the output resolution for the at least one of the plurality of image planes.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
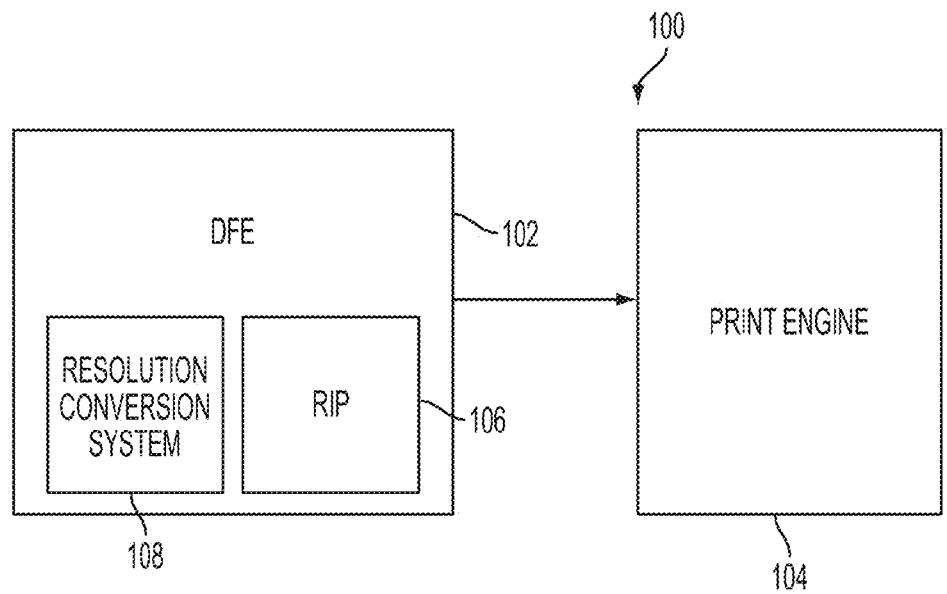
FIG. 1 shows an exemplary image printing system having a resolution conversion system in accordance with an embodiment of the present disclosure.

The proposed method of the present patent application is configured to augment a fixed resolution binary image path with processing to enable detection of single separation text characters within the binary pixel stream and to re-render the detected text characters to a marker optimized resolution specific to that color separation. In one embodiment, the proposed method provides resolution independent rendering of fully saturated primary ink colors, for example, in continuous feed image printing systems. The proposed method includes a post process to the PDL imaging to recognize text or MICR characters and to convert the recognized text or MICR characters to a format that can be rendered later in the binary image path. This allows the PDL imaging to process independent of the text or MICR characters. As the inkjet printing systems have various rendering points for the resulting contone and binary images, there are opportunities for further processing of the images.

The proposed method is relevant to marking engines with different marker resolutions for different color separations. For example, a MICR marking module for MICR optimized print heads that require a different resolution than the other color separations. Optimized pixel patterns for each MICR character can then be used for optimized reading.

The proposed method is also used for a black color separation if the marker has an enhanced resolution to produce high resolution text. The proposed method is also used to detect MICR characters that have been encoded within a black color separation.

Benefits of the proposed method include reuse of fixed resolution binary image paths for marking engines that have marking modules of differing print resolution, including MICR marking modules, high-resolution black modules, and annotation marking modules. In addition, the proposed method enables using a standard color separation to encode MICR characters.

U.S. patent application Ser. No. 13/644,932 (the '932 Application), which is commonly assigned to the same entity as the present patent application and herein is incorporated by reference in its entirety, describes a method and system that address the resolution conversion of MICR content in continuous tone image paths using a pure template substitution. By contrast, the proposed method and system of the present patent application address the resolution conversion of textual content and/or MICR content in binary image paths using template recognition and character re-rendering. That is, the present patent application provides a technique for resolution conversion of text or MICR characters specifically from bitmap back to a byte stream character encoding. The encoded text can then be re-rendered for optimal appearance at the new resolution. The re-rendering may use any common technology including bitmap fonts or contour fonts as the basis. These formats are used in the RIPs for the original rendering of the characters at the initial resolution.

In the proposed method, the received image data includes "N" separations or image planes in which one separation is for the MICR or textural content and N−1 separations are for the balance of the image content (e.g., CMYK content). Compared to the '932 Application, the resolution conversion of MICR content is done differently in the present patent application. That is, in the present patent application, the MICR separation or image plane goes through detection logic to identify the MICR characters. The detected MICR characters are encoded per the E13B or CMC7 encoding along with their X, Y positioning information. Once the encoding is done and the MICR character encodings and their corresponding X, Y positioning information are obtained, the MICR image plane and its MICR characters are then discarded. The MICR character encodings and their corresponding X, Y positioning information are sent to the print engine (i.e., in place of the MICR image plane or separation) along with N−1 separations having the balance of the image content (e.g., CMYK content).

In the present patent application, the resolution conversion of textural content is similar to the resolution conversion of MICR content except that the image plane or separation that includes the textural content is not discarded during the resolution conversion. However, once the encoding is done and the textural character encodings and their corresponding X, Y positioning information are obtained, the textural characters are discarded.

Also, in the present patent application, the resolution conversion of MICR content on a black color image plane is similar to the resolution conversion of MICR content on the MICR image plane except that the black color image plane or separation that includes the MICR content is not discarded during the resolution conversion. Only the MICR characters on the black color image plane are discarded after obtaining the MICR character encodings and their corresponding X, Y positioning information.

Figure 2:
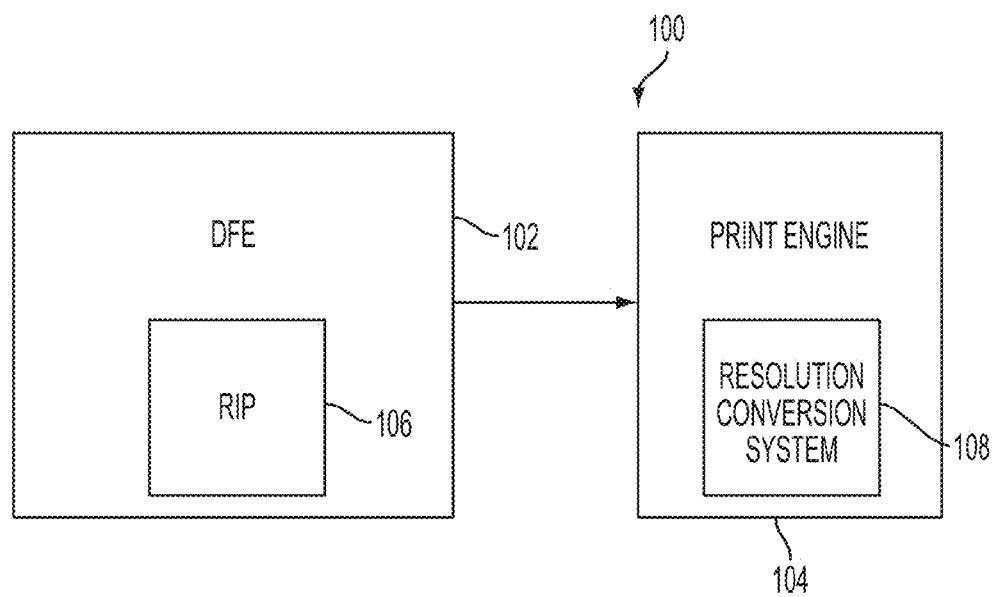
FIG. 2 shows another exemplary image printing system having a resolution conversion system in accordance with another embodiment of the present disclosure.

FIGS. 1 and 2 show exemplary image printing systems, each having a system for resolution conversion of MICR or textural content in the image in accordance with embodiments of the present disclosure.

The image printing system 100 generally includes a Digital Front End (DFE) 102 and a print engine 104 (or marker or marking engine) for applying toner or ink to an image bearing surface, such as a photoreceptor belt or drum, where the belt then transfers the images to a substrate. Alternately, the print engine 104 may apply the toner or ink directly to the substrate.

The DFE 102, as used herein, generally refers to an application that typically takes the form of a general purpose computer executing DFE Application Software, or takes the form of a special purpose computer (such as an Application-Specific Integrated Circuit (ASIC)), as are widely known in the digital document reproduction arts. The DFE is able to load input files (such as Postscript files) composed of text, images and vector graphs from various input network sources (e.g., a publishing application, a desktop PC application such as InDesign, a scanner, a digital camera, etc.) and process the files so that they can be output on digital equipment, for example, a small desktop printer or a large digital press. The DFE includes various function processors, e.g., a Raster Image Processor (RIP) 106, image positioning processor, image manipulation processor, color processor, or image storage processor. In some embodiments, the DFE permits a user to set up parameters such as layout, font, color, paper type, or post-finishing options.

The RIP 106 of an image printing system 100 generally converts or rasterizes input files into a print-ready form (e.g., image bitmaps) acceptable by the print engine. The input files may include a page description in a high-level page description language or another bitmap of higher or lower resolution than the output device (e.g., print engine). The print-ready forth (e.g., raster image or bitmap/bytemap) produced by the RIP is then sent to the print engine for output. In illustrated embodiments of FIGS. 1 and 2, the RIP 106 is implemented as an integral component of the DFE 102. However, in other embodiments, the RIP 106 may be implemented as a separate system from the DFE 102.

The print engine 104 receives the rasterized image bitmap from the DFE 102 or the RIP 106 and renders the bitmap into a form that controls the image printing process from the exposure device to transferring the print image onto the image bearing surface, such as a photoreceptor belt or drum. The print engine 104 may mark xerographically; however, it will be appreciated that other marking technologies may be used, for example by ink-jet marking, ionographically marking or the like. The print engine 104 may be operatively connected one or more sources of printable substrate media, an output path and a finishing system. The print engine 104 may be a multi-color engine having a plurality of imaging/development subsystems that are suitable for producing individual color images. A stacker device may also be provided for the print engine 104 as known in the art. The finishing system applies features such as protection, glossing, or binding to the prints. The finishing system may be implemented as an integral component of the image printing system, or as a separate system through which prints are fed after they are printed.

The print engine 104 includes MICR print heads and/or high resolution print heads. That is, the print engine 104 may be equipped with MICR print heads or a separate MICR print station that requires different resolution images than the print heads printing the other N−1 separations (i.e., having CMYK content). The print engine 104 may also include a black color station printing with more heads and therefore providing higher resolution to improve text. In this case full character recognition, not just MICR, is required to achieve optimal rendering.

The DFE 102 is configured to receive an input job or jobs. The DFE 102 is configured to output images of the received jobs having color signals intended to be printed. The received job may include images as part of its content. The DFE 102 produces "N" separations of the content of each received page image in which one separation is for the MICR or textural content and N−1 separations are for the balance of the image content (e.g., CMYK content). The DFE generates all separations at the same resolution (i.e., RIP resolution). The RIP 106 is configured to Raster Image Process (RIP) the image containing textural or MICR content and CMYK content.

Figure 3:
FIG. 3 shows CMYK image content of a N-separation image in accordance with an embodiment of the present disclosure.
Figure 4:
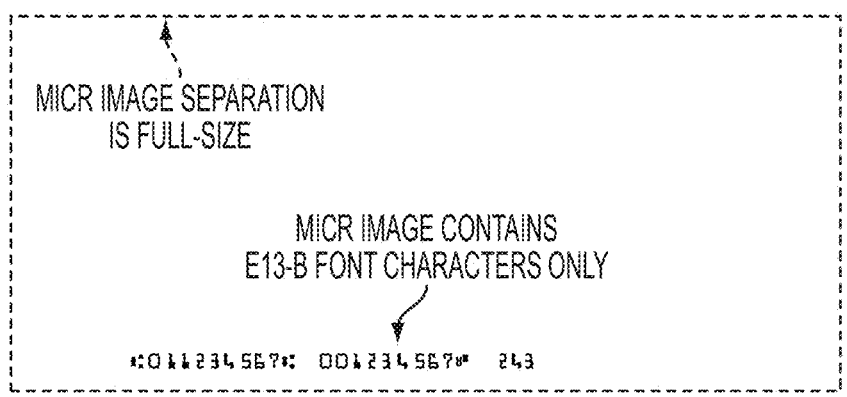
FIG. 4 shows MICR image content of the N-separation image in accordance with an embodiment of the present disclosure.

For example, DFE 102 may produce five separations of an exemplary image (not shown). CMYK image content of the exemplary five-separation image is shown in FIG. 3, while MICR image content of the exemplary five-separation image is shown in FIG. 4. CMYK image content includes Cyan (C) image content, Magenta (M) image content, Yellow (Y) image content, and Black (K) image content. Cyan image content, Magenta image content, Yellow image content, Black (K) image content and MICR image content are each on one of the five image separations. That is, there are four separations or image planes (one for each of Cyan (C), Magenta (M), Yellow (Y), and Black (K)) for the CMYK content. The CMYK image planes or separations of FIG. 3 and MICR image plane or separation of FIG. 4 are full-size images.

The characters of the MICR image plane or separation are created with MICR fonts (e.g., E-13B font or CMC-7 font) and are known as MICR characters, which are printed with MICR toner or ink. MICR Toner is a specialty toner which provides the magnetic charge, allowing the MICR line to be read. The combination of toner/ink and fonts create the machine readable MICR line. MICR toner or ink is often used for printing documents that may be read by automated high-speed scanners, such as, for example, the printing of routing numbers on personal checks. The MICR image plane or separation of FIG. 4 includes E13-B font MICR characters. For example, such MICR characters appear at the bottom of checks or financial documents. An output from the image printing system has these images (i.e., CMYK image planes or separations of FIG. 3 and MICR image plane or separation of FIG. 4) superimposed on each other. For example, when these images are superimposed on each other, MICR characters 40 of MICR image plane or separation of FIG. 4 fit into the holes 42 of CMYK image planes or separations of FIG. 3.

In another embodiment, not illustrated here, the DFE 102 produces "N" separations of the content of each received page image in which one separation is for the textural content and N−1 separations are for the balance of the image content (e.g., CMYK content). The textural content is configured to be processed by high resolution print heads (i.e., more print heads).

The print engine 104 is configured to accept the N-separation image from the DFE 102 or the RIP 106. RIP operates at a resolution appropriate for a solid ink jet (e.g., CMYK) print head. The print engine 104 is also configured to accept N−1 separation images and X,Y positioning information and character encodings in place of separation N.

The high resolution print heads of the print engine 104 that are used to produce high resolution text characters operate at a different resolution than that of the solid ink jet print heads. For example, the high resolution print head may be expecting an image having a resolution of 600×600. In such a case, if an image having 600×390 resolution is supplied to the high resolution print head, then the resulting image from the high resolution print head will not be printed correctly.

Similarly, the MICR print heads of the print engine 104 that are used to produce magnetic ink characters operate at a different resolution than that of the solid ink jet print heads. For example, the MICR print head may be expecting an image having a resolution of 600×600. In such a case, if an image having 600×390 resolution is supplied to the MICR print head, then the resulting image from the MICR print head will not be printed correctly.

The system 108 of the present disclosure provides a technique for converting resolution of the textural or MICR separation from the RIP resolution to the resolution required by their respective high resolution text print heads or MICR print heads. In one embodiment, as shown in FIG. 1, the system 108 for resolution conversion of textural or MICR content in the image is implemented as a component of the DFE. That is, in the system as shown in FIG. 1, the DFE creates a MICR or textural separation in the alternate resolution. This would be done after RIP, but prior to sending the MICR separation or high resolution textural separation to the print engine 104. In another embodiment, as shown in FIG. 2, the system 108 for resolution conversion of textural or MICR content in the image is implemented as a component of the print engine 104. The basic structure and operation of the system 108 in both these embodiments of FIGS. 1 and 2 remain the same.

The system 108 for resolution conversion of MICR or textual content in the image generally includes one or more processors performing the functions described below. The system 108 is configured to: receive image data of the image, the image data having a plurality of image planes having essentially the same resolution, wherein at least one of the plurality of image planes includes textual image data configured to be rendered by a print engine with an output resolution different from the remaining image planes; process the at least one of the plurality of image planes to identify one or more characters contained therein and to obtain character encoding data and positional information for the one or more identified characters; and process the obtained character encoding data and the obtained positional information to generate an output data at the output resolution for the at least one of the plurality of image planes. In one embodiment, the at least one of the plurality of image planes that includes textual image data is a MICR image plane.

Figure 5:
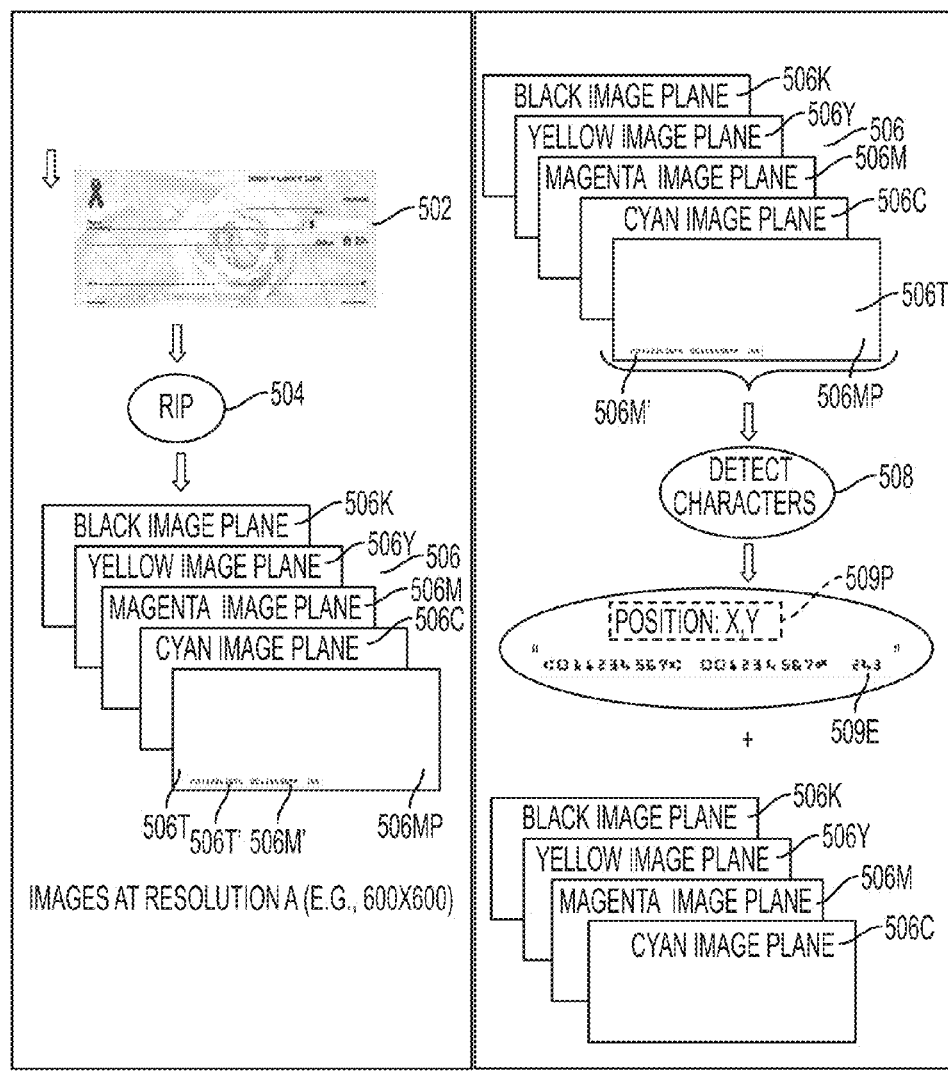
FIG. 5 shows a flow chart of a method for resolution conversion of textual content or MICR content in an image in accordance with an embodiment of the present disclosure.

Referring to FIG. 5, an incoming image 502 (e.g., check) is RIPped at 504 to a plurality of separations or image planes 506 (i.e., 506C, 506M, 506Y, 506K and/or 506C, 506M, 506Y, 506K, 506MP). The plurality of image planes 506 having essentially the same resolution. At least one 506T of the plurality of image planes 506 includes textual image data 506T' configured to be rendered by a print engine with an output resolution different from the remaining image planes. The textural image data 506T' may include MICR characters 506M' on a separate MICR image plane 506MP, high resolution textural characters in a black color image plane, and MICR characters on a black color image plane.

The MICR separation or image plane 506MP then goes through detection logic at 508 to identify the MICR characters 506M'. That is, the image path implements pattern matching software or firmware that detects the specific MICR characters at the RIP resolution, which is the same resolution as all of the other separations in the image. For example, the detected MICR characters are encoded per the E13B or CMC7 encoding along with the positioning information 509P. The X, Y positioning information 509P is a translation of the character origin from an incoming image's coordinate space to an outgoing image's coordinate space or to a generic coordinate space like Meters. Once the encoding is done and the MICR character encodings 509E and the X, Y positioning information 509P are obtained, the MICR image plane 506MP and the MICR characters 506M' are discarded.

The MICR detector implementation may be relatively simple because the number of MICR characters 506M' being matched is small. That is, there are 14 characters in the E-13B MICR font and 15 characters in the CMC-7 MICR font that need to be detected. Also, the properties of the MICR or textual characters are very well known. That is, the printer image path knows exactly how the DFE will produce them. Further, there is no extraneous content in the MICR plane that would confound matching, which is all other job content is in the other separations.

In one embodiment, the detection logic includes one set of "match" patterns for each of the four orientations, each at 90° from the last (i.e., 0°, 90°, 180°, 270°). Similarly, there may be "substitute" patterns in 1, 2 or 4 orientations depending on: whether or not the pattern substitution function implements a rotation operation; and whether or not the outgoing resolution of the MICR image separation or plane is to be symmetric (e.g. 600×600) or asymmetric (e.g. 600×470).

The rotation operation generally refers to an operation which rotates the detected MICR character by +90° or −90°. In one embodiment, the detection logic is configured to rotate the detected MICR character by +90° or −90°.

An asymmetric resolution generally has a different resolution in the vertical orientation and horizontal orientation, while the symmetric resolution has a same resolution both in the vertical orientation and in the horizontal orientation. For example, if the outgoing MICR image separation or plane resolution is asymmetric, then substitute patterns for each of the four orientations (i.e., 0°, 90°, 180°, 270°) are stored. On other hand, if the outgoing MICR image separation or plane resolution is symmetric, substitute patterns in a single orientation are stored. This is because the MICR character(s) having a symmetric resolution may be easily rotated (either using a hardware or software). In one embodiment, MICR match/substitute characters may be custom tuned, for example, by modifying pixel values. The custom tuning of the characters provides optimal or improved magnetic readability. That is, the magnetic readers read these characters more reliably when turned this way.

The same detection logic works for other color planes and character shapes. Black is the most common color for text and printers often have higher resolution black color print heads or more black color print heads. The difference here is that only the detected character shapes are discarded, not the entire black color image plane. The detection logic also work with contone planes, but is more straight forward with binary planes. The detection logic in the image path is generally used after the conversion from contone to binary.

Figure 6:
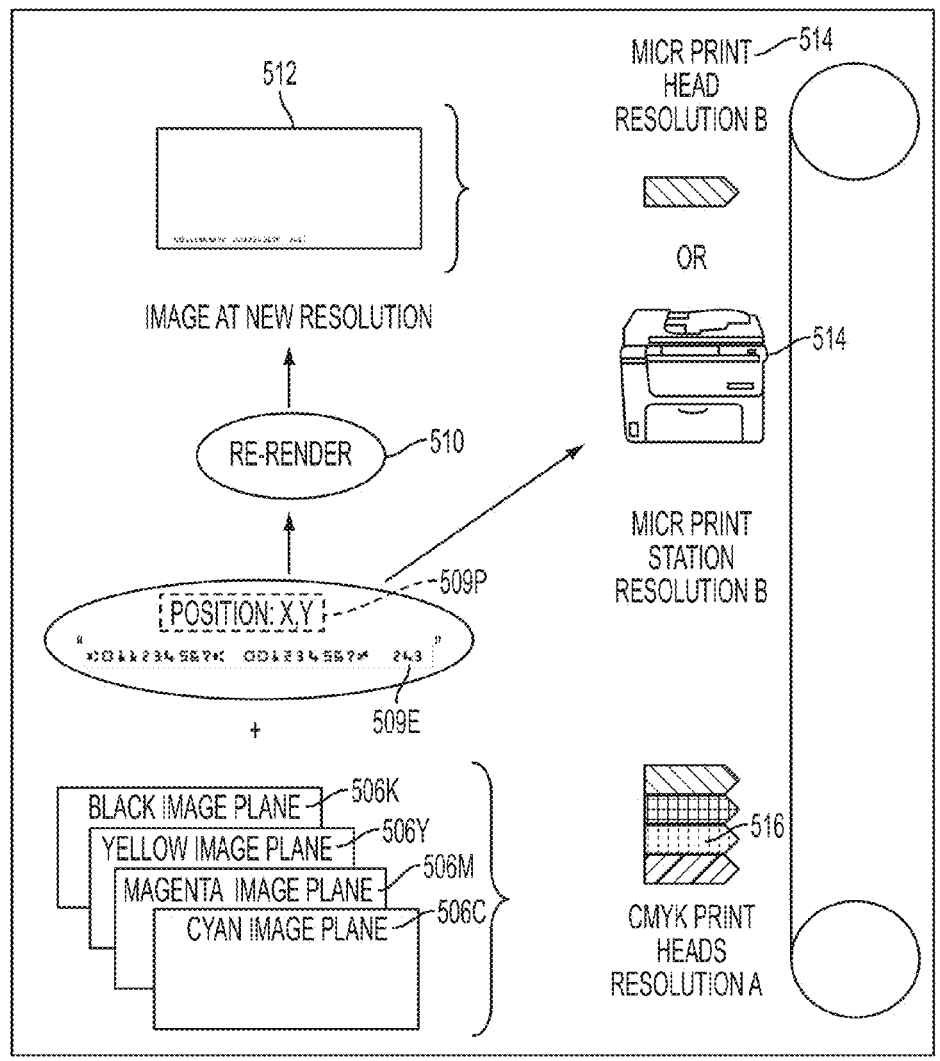
FIG. 6 shows another flow chart of the method for resolution conversion of textual content or MICR content in the image in accordance with an embodiment of the present disclosure.

As shown in FIG. 6, the CMYK image planes 506C, 506M, 506Y, 506K and the MICR character string encoding 509E and its positioning information 509P (i.e., instead of the MICR image plane 506MP) are then sent for final rendering at 510 to obtain output data 512 that will be printed by the print engine 514 at the output resolution, which is different from the resolution of the print engine 516 printing the CMYK content. As noted above, the MICR image plane 506MP and the MICR characters 506M' are discarded once the MICR character string 509E and its positioning information 509P are obtained.

Figure 7:
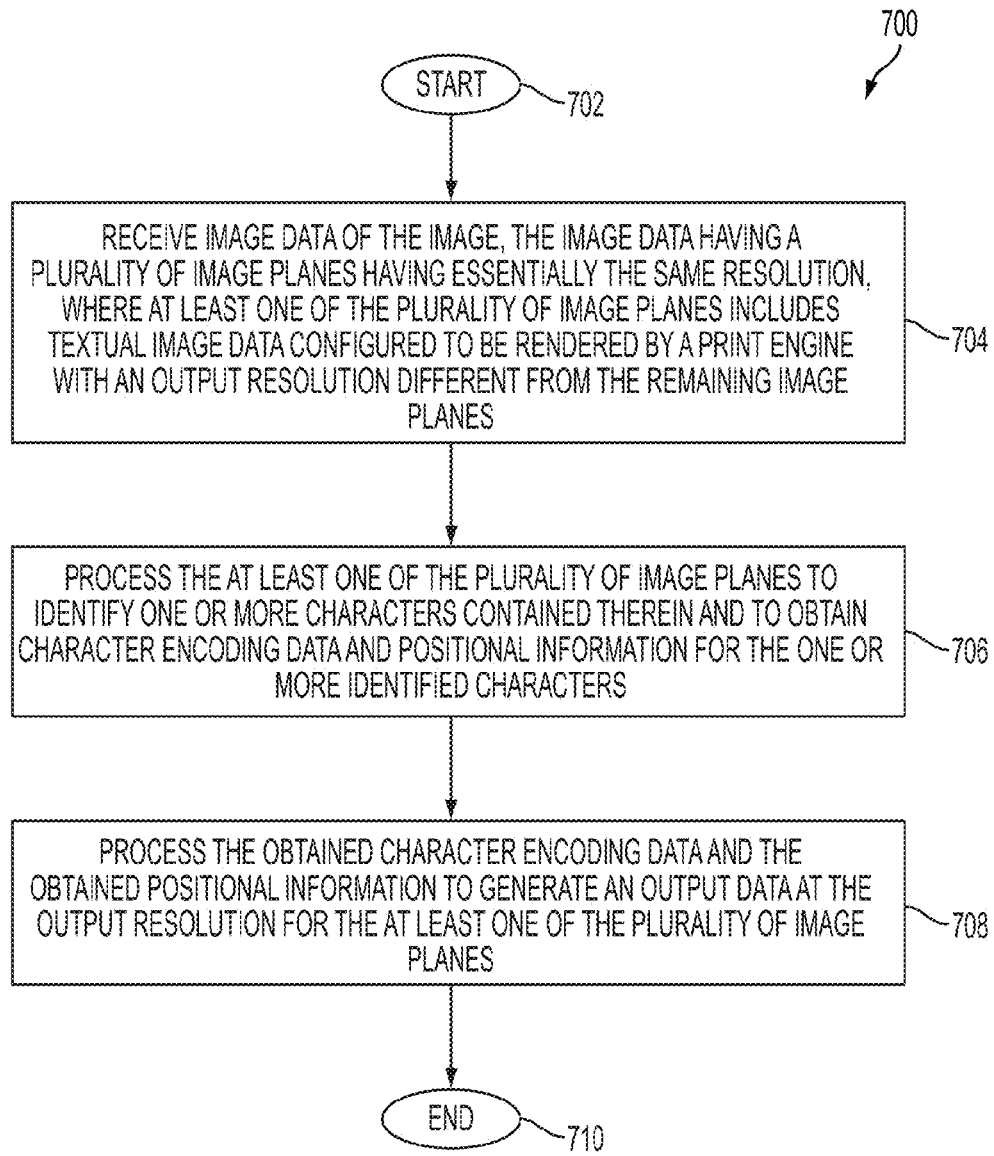
FIG. 7 shows a detailed flow chart of the method for resolution conversion of MICR content in the image in accordance with an embodiment of the present disclosure.

Although not shown here, when processing the MICR characters 506M' on the black color image plane, the CMYK image planes and the MICR character string and its positioning information are sent for final rendering and printing. In this case, once the MICR character string and its positioning information are obtained, the black color image plane having the MICR characters is not discarded. Rather, the black color image plane is sent for final rendering and printing along with the CMY image planes and the MICR character string encoding and its positioning information. In one embodiment, the MICR characters on the black color image plane are discarded after obtaining the MICR character string encoding and its positioning information Similarly, when processing the textural characters on the black color image plane, the CMYK image planes and the textural character string encoding and its positioning information are sent for final rendering and printing. In this case, once the textural character string encoding and its positioning information are obtained, the black color image plane having the textural characters is not discarded. Rather, the black color image plane is sent for final rendering and printing along with the CMY image planes and the textural character string and its positioning information. In one embodiment, the textural characters on the black color image plane are discarded after obtaining the textural character string encoding and its positioning information FIG. 7 shows a detailed flowchart summarizing a method 700 for resolution conversion of MICR and textural image data in an image. The method 700 is implemented in a computer system comprising one or more processors configured to execute one or more computer program modules. The method 700 begins at procedure 702.

Referring to FIGS. 1, 2 and 7, at procedure 704, image data of an input image is received by the resolution conversion system 108. In one embodiment, as noted above, the DFE receives the input image, processes the input image and sends the image data of the input image to the resolution conversion system 108. The image data has a plurality of input image planes in which one plane has a textural image data and/or MICR image data with an output resolution different from the remaining image planes. Also, the plurality of image planes has essentially the same resolution (i.e., RIP resolution).

The processors of the resolution conversion system 108 are configured to a) convert the resolution of the MICR image data to a resolution of a MICR print head different from the remaining image planes and b) convert the resolution of the textural image plane to a resolution of a high resolution print head different from the remaining image planes. For example, referring to FIGS. 5-7, at procedure 706, the at least one of the plurality of image planes are processed to identify one or more characters contained therein and to obtain character encoding data and positional information for the one or more identified characters.

In one embodiment, when a given character is detected, the character may be encoded for later rendering in the image path. In an alternative embodiment, the textural or MICR characters could be re-rendered immediately into another plane of the proper resolution.

Textural character recognition techniques used in scanning software may be used for textural content. For example, U.S. Pat. Nos. 4,034,343; 5,668,891; and 5,524,066, which herein are incorporated by reference in their entirety, describe in detail some exemplary textural character recognition techniques. The character recognition software is configured to handle different resolutions based on the original rendering. In one embodiment, the textural or MICR characters in the table may be custom tuned (i.e., by adding or subtracting pixels) for optimal magnetic readability.

In one embodiment, the MICR capability or high resolution text capability may be added to an image printing system by attaching a separate MICR print engine and a separated high resolution text print engine to either the input of or the output of a normal CMYK print engine. In such an embodiment, the DFE is configured to drive the MICR, the high resolution and CMYK print engines, sending only the CMYK separations or image planes to the CMYK print engine, the MICR separations or image planes to the MICR print engine, and the textural content to the high resolution print engine.

Then, at procedure 708, the obtained character encoding data and the obtained positional information are processed to generate an output data at the output resolution for the at least one of the plurality of image planes. The method ends at procedure 710.

A display device may be provided to enable the user to control various aspect of the system 108, in accordance with the embodiments disclosed therein. The system 108 includes one or more processors that execute, and a memory that stores, computer-executable instructions for carrying out the various procedures and performing the various functions described herein.

The proposed method of the present patent application provides resolution conversion of MICR and character image information. The proposed method of the present patent application also has the ability to customize printed MICR and other characters for optimal magnetic and visual readability based on web speed.

The method proposed in the present patent application is an improvement over traditional resolution interpolation schemes (e.g., nearest neighbor) because the proposed method deals easily with the binary content (i.e., having only 0 or 255 values) in an otherwise contone image. The proposed method also allows for customization within the conversion so that magnetic readability (rather than optical readability) may be preserved or optimized. Furthermore, the proposed method gracefully accommodates non-standard and asymmetric resolutions. Other benefits of the proposed method include support of multiple print stations with varying resolutions. Typically, there is one primary print station and the initial RIP is tuned for that primary print station. This technique insures that the primary RIP determines positioning and other key imaging decisions for all the planes (e.g., knockouts).

For the purposes of the discussion in the present disclosure, an "image" is a pattern of physical light or a collection of data representing said physical light and may include characters, words, and text as well as other features such as graphics. A "digital image", by extension, is an image represented by a collection of digital data. An image may be divided into "segments," each of which is itself an image. A segment of an image may be of any size up to and including the whole image.

In a digital image composed of data representing physical light, each element of data may be called a "pixel," which is common usage in the art and refers to a picture element. Each pixel has a location and value. Each pixel value may be one or more bits in a binary form, a gray scale value in a gray scale form, or a set of color space coordinates in a color coordinate form. The binary form, gray scale form, and color coordinate form may each form a two-dimensional array defining an image. An operation performs "image processing" when it operates on an item of data that relates to part of an image.

The "image data" refers to information in a form that can be digitally transmitted or processed. The "printing system" refers to an apparatus arrangement suited to accepting image data and rendering that image data upon a substrate.

"Toner" refers to the wet or dry material that forms an image or text on a substrate. The terms ink and toner are used interchangeably to refer to this material.

"Magnetic ink" may refer to ink that is used in magnetic ink character recognition ("MICR"), a character recognition technology where MICR characters are printed with magnetic ink or toner. Positive additives to the magnetic ink or toner may include iron oxide.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for resolution conversion of textual content or Magnetic Ink Character Recognition (MICR) content in an image, the method being implemented in a computer system comprising one or more processors configured to execute one or more computer program modules, the method comprising:

receiving, at a processor, image data of the image, the image data having a plurality of image planes having essentially the same input resolution, wherein at least one of the plurality of image planes includes textual image data configured to be rendered by a print engine with an output resolution different from that of the remaining image planes, wherein the remaining image planes have the same input and output resolutions, wherein the output resolution of the at least one of the plurality of image planes is essentially the same as the resolution of the print engine, and wherein the textual image data includes high resolution text characters, MICR characters, or both;

processing the at least one of the plurality of image planes to identify one or more characters contained therein and to obtain character encoding data and positional information for the one or more identified characters of the at least one of the plurality of image planes; and processing the obtained character encoding data and the obtained positional information to generate an output data at the output resolution for the at least one of the plurality of image planes.

2. The method of claim 1, wherein the textual image data includes the MICR characters on a MICR image plane, the high resolution text characters in a black color image plane, or the MICR characters in the black color image plane.

3. The method of claim 2, wherein the at least one of the plurality of image planes includes the MICR image plane and the black color image plane.

4. The method of claim 3, wherein the processing of the MICR image plane having the one or more MICR characters includes discarding the MICR image plane and the MICR characters after obtaining the character encoding data and the positional information.

5. The method of claim 3, wherein the processing of the black color image plane having the one or more MICR characters includes discarding the MICR characters after obtaining the character encoding data and the positional information.

6. The method of claim 3, wherein the processing of the black color image plane having the high resolution text characters includes discarding the text characters after obtaining the character encoding data and the positional information.

7. The method of claim 1, wherein the positional information is a X, Y positioning information that is a translation of the character origin from an incoming image's coordinate space to an outgoing image's coordinate space.

8. The method of claim 1, wherein the processing the obtained character encoding data and the obtained positional information includes re-rendering the obtained character encoding data and the obtained positional information to generate the output data at the output resolution.

9. The method of claim 1, wherein the character encoding data includes MICR character string encoded per E13B or CMC7 encoding.

10. The method of claim 1, wherein the character encoding data includes textual character string encoding.

11. The method of claim 1, wherein the remaining image planes are rendered by a second print engine having a resolution that is different from the resolution of the print engine rendering the at least one of the plurality of image planes.

12. A system for resolution conversion of textual content or Magnetic Ink Character Recognition (MICR) content in an image, the system comprising:

at least one processor comprising a memory storing one or more computer program modules configured to:

receive image data of the image, the image data having a plurality of image planes having essentially the same input resolution, wherein at least one of the plurality of image planes includes textual image data configured to be rendered by a print engine with an output resolution different from that of the remaining image planes, wherein the remaining image planes have the same input and output resolutions, wherein the output resolution of the textual image data of the at least one of the plurality of image planes is essentially the same as the resolution of the print engine, and wherein the textual image data includes high resolution text characters, MICR characters, or both;

process the at least one of the plurality of image planes to identify one or more characters contained therein and to obtain character encoding data and positional information for the one or more identified characters of the at least one of the plurality of image planes; and process the obtained character encoding data and the obtained positional information to generate an output data at the output resolution for the at least one of the plurality of image planes.

13. The system of claim 12, wherein the textual image data includes the MICR characters on a MICR image plane, the high resolution text characters in a black color image plane, or the MICR characters in the black color image plane.

14. The system of claim 13, wherein the at least one of the plurality of image planes includes the MICR image plane and the black color image plane.

15. The system of claim 14, wherein, when processing the MICR image plane having the one or more MICR characters, the processor is configured to discard the MICR image plane and the MICR characters after obtaining the character encoding data and the positional information.

16. The system of claim 14, wherein, when processing the black color image plane having the one or more MICR characters, the processor is configured to discard the MICR characters after obtaining the character encoding data and the positional information.

17. The system of claim 14, wherein, when processing the black color image plane having the high resolution text characters, the processor is configured to discard the high resolution text characters after obtaining the character encoding data and the positional information.

18. The system of claim 12, wherein the positional information is a X, Y positioning information that is a translation of the character origin from an incoming image's coordinate space to an outgoing image's coordinate space.

19. The system of claim 12, wherein, when processing the obtained character encoding data and the obtained positional information, the processor is configured to re-render the obtained character encoding data and the obtained positional information to generate the output data at the output resolution.

20. The system of claim 12, further comprising a single Raster Image Processor (RIP) that is configured to convert or rasterize the image into the image data.

* * * * *